United States Patent
Kobayashi et al.

(10) Patent No.: US 6,523,456 B1
(45) Date of Patent: *Feb. 25, 2003

(54) SLIDING MEMBERS AND PISTON FOR INTERNAL COMBUSTION ENGINE

(75) Inventors: Shigemi Kobayashi, Wako (JP); Masashi Murata, Wako (JP); Hidemi Ogihara, Wako (JP); Hiroshi Yamada, Wako (JP); Kazuhisa Ishizuka, Wako (JP); Sakae Tsunashima, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/763,612

(22) PCT Filed: Jun. 27, 2000

(86) PCT No.: PCT/JP00/04207

§ 371 (c)(1),
(2), (4) Date: May 3, 2001

(87) PCT Pub. No.: WO01/02712

PCT Pub. Date: Jan. 11, 2001

(30) Foreign Application Priority Data

Jul. 5, 1999 (JP) ............................................. 11-191066

(51) Int. Cl.[7] ................................................ F01B 31/10
(52) U.S. Cl. ...................................................... 92/158
(58) Field of Search ................................ 92/153, 20 R, 92/172, 158, 162 R

(56) References Cited

U.S. PATENT DOCUMENTS

| | | | | | |
|---|---|---|---|---|---|
| 3,138,413 | A | * | 6/1964 | De Woody | 384/114 |
| 4,258,084 | A | * | 3/1981 | Hayden, Sr. | 29/888.06 |
| 5,239,955 | A | * | 8/1993 | Rao et al. | 92/223 |
| 5,592,840 | A | * | 1/1997 | Miyasaka | 29/90.7 |
| 6,059,460 | A | * | 5/2000 | Ono et al. | 384/283 |
| 6,095,690 | A | * | 8/2000 | Niegel et al. | 384/288 |

FOREIGN PATENT DOCUMENTS

| | | |
|---|---|---|
| JP | A-52-16451 | 2/1977 |
| JP | A-57-193941 | 12/1982 |
| JP | A-1-229198 | 9/1989 |
| JP | A-4-118824 | 4/1992 |
| JP | A-6-41722 | 2/1994 |
| JP | A-7-12658 | 3/1995 |

* cited by examiner

*Primary Examiner*—Edward K. Look
*Assistant Examiner*—Igor Kershteyn
(74) *Attorney, Agent, or Firm*—Arent Fox Kintner Plotkin & Kahn, PLLC

(57) ABSTRACT

A sliding surface of at least one of sliding members sliding with respect to each other in a sliding direction comprises a protrusion extending along a direction intersecting the sliding direction and fine dimples provided on a surface of the protrusion. In the sliding members, lubricating oil is accumulated in the dimples, and is easily extracted through a drain portion formed by dimple in a running-in operation.

26 Claims, 11 Drawing Sheets

SLIDING MEMBERS AND PISTON FOR INTERNAL COMBUSTION ENGINE

BACKGROUND OF THE INVENTION

1. Technical Field

The present invention relates to sliding members which can maintain sufficient amounts of lubricating oil between sliding surfaces of sliding members sliding with respect to each other and which can reduce sliding resistance and can effectively avoid production of an unusual noise therebetween. The present invention also relates to a piston for internal combustion engines, which can hold sufficient amounts of lubricating oil on the sliding surface with a sleeve.

2. Background Art

In order to reduce the sliding resistance of sliding members, fluorine compounds, silicon, or the like, have been added to the materials of sliding members, or alternatively, coatings made from materials such as molybdenum and fluorine resin have been provided heretofore. However, the former case cannot yield substantial reduction in sliding resistance, and the later case has problems in that the coating flakes off or wears.

In particular, in a piston for internal combustion engines (hereinafter referred to simply as a "piston"), a part of the explosive pressure in the combustion chamber is received by a piston ring which slides with respect to a sleeve. The position of the piston is maintained by contacting a skirt portion provided at the lower portion of the piston with the sleeve. Therefore, if the contact of the skirt portion with the sleeve is not smoothly performed, the sliding resistance increases, whereby the fuel consumption is increased, and an unusual noise is produced due to the contact of the piston with the sleeve in some cases.

Japanese Utility Model Applications, First Publications, Nos. 16451/77 and 193941/82 propose methods in which fine dimples are formed on a skirt portion of pistons by sandblasting or shot peening. It is known that these methods cannot yield the effect of avoiding production of an unusual noise.

In general, it is known that surfaces sliding with respect to each other initially undergo severe wear. The reason for this is that sharp edges formed by machining are worn initially, and such wear is called "initial wear". The initial wear occurs while being integrally affected by several factors, such as the amount of lubricating oil supplied to the sliding surfaces, surface pressure exerted on the sliding surfaces, sliding speed, surface roughness of the sliding surfaces, and heat generated by the effects of these factors. The wear amount and the sliding resistance are reduced when these factors are balanced (running-in phenomenon). After the running-in phenomenon, large amounts of wear does not occur as long as the balance is not disrupted. However, when the supply of a lubricating oil or the relative speed of the sliding, or the like, changes greatly, heat generation, rapid wear, and macro deformation of the sliding surface may occur, and these may cause an unusual noise.

Therefore, the present invention is based on the initial wear on the sliding members, and it is object of the invention to provide sliding members having ideal surface properties after the initial wear. That is, the object of the invention is to provide sliding members in which the sliding is smoothly performed after the initial wear, and an unusual noise can be effectively avoided. Furthermore, another object of the invention is to provide a piston to which the sliding members are applied, so that the clearance between the skirt portion and the sleeve can be narrow, whereby the position of the piston can be stable, and tapping of the piston can be prevented, and noise and vibration are therefore suppressed. It is a further object of the invention to reduce the sliding resistance in an early stage by occurrence of initial wear in a short time in an initial stage of operation.

SUMMARY OF THE INVENTION

The present invention provides sliding members having a sliding surface and which slide with respect to each other in a sliding direction, the sliding surface of at least one of the sliding members comprising: a protrusion extending along a direction intersecting the sliding direction; and fine dimples provided on a surface of the protrusion. The protrusion preferably extends in a direction perpendicular or approximately perpendicular to the sliding direction. The present invention further provides a piston comprising: a piston body; a skirt portion provided on a side surface of the piston body; a protrusion provided on at least the skirt portion and extending along the outer circumference thereof; and fine dimples provided on a surface of the protrusion. The functions of the invention will be explained with reference to pistons in FIG. 1A and other figures.

FIG. 1A shows a surface of a skirt portion of a piston without dimples, which is shown by a computer generated illustration, and shows protrusions extending along the outer circumference of the piston body. FIG. 1A shows the state of the outer circumference of the piston body after machining. The protrusion is formed between recesses having a circular cross section. The machining can be performed such that the outer circumference of the piston body is cut by a bite when relatively feeding the piston body in the axial direction thereof. In this case, the protrusion spirals along the axial direction.

When initial wear occurs on the piston, the edge portion of the protrusion is worn away so as to be approximately trapezoidal in cross section as shown FIG. 1B. The trapezoidal portion consists of a sliding surface and edge E formed at the peripheral portions thereof, and the edge E inhibits the lubricating oil accumulated in the recesses from being supplyed to the sliding surface which requires lubrication. FIGS. 2A and 2B show a cross section of the protrusion shown in FIGS. 1A and 1B, wherein FIG. 2A shows a status after machining and FIG. 2B shows a status after the initial wear. As is understood from FIG. 2B, the edge formed at the peripheral portion of the sliding surface after the initial wear functions as a spike, and the lubricating oil cannot be supplied at some portions. In this case, the temperature of the portions would be increased and cause an unusual noise.

FIG. 3A shows a surface of a skirt portion of the piston according to the invention, which is shown by a computer generated illustration, and shows a protrusion extending along the outer circumference of the piston body and fine dimples formed on the surface of the protrusion. When initial wear occurs on the piston, the edge portion of the protrusion is worn away so as to be approximately trapezoidal in cross section as shown FIG. 3B. The dimples form drain portions B at the peripheral portions of the sliding surface on the trapezoidal portion.

The functions of the dimples in the invention will be explained with reference to FIGS. 5A and 5B. As shown in FIG. 5A, the surface of the piston in the machine-finished state has plural V-shaped grooves extending along the outer circumference thereof when seen magnified. When lubricating oil is provided to the surface and surface pressure is exerted thereto, the lubricating oil is easily accumulated at the bottom of the groove due to capillary effect rather than the top edge portion, so that an oil film is difficult to be formed and the sliding resistance is large. In contrast, FIG. 5B shows an embodiment of the dimple according to the invention. When lubricating oil is provided to such a surface, as shown in FIG. 5C, the dimple functions as an oil reservoir and accumulates oil droplet O. Therefore, the oil film S is maintained when surface pressure is exerted on the surface, and increase of the sliding resistance is thereby prevented.

According to the invention, each fine dimple accumulates the lubricating oil, and the lubricating oil can be easily supplied to the sliding surface through the drain portion B by reciprocal movement of the piston. Therefore, after the initial wear has occurred and the piston is fitted to the sleeve, the lubricating oil is supplied to the sliding portion to form an oil film, thereby lubricating the sliding surface and avoiding an unusual noise. FIGS. 4A and 4B are cross sections of the protrusion shown in FIGS. 3A and 3B, wherein FIG. 4A shows the status before the initial wear, and FIG. 4B shows the status after the initial wear. As is shown in FIG. 4A, since the protrusion is formed with dimples, the initial wear occurs rapidly. A running-in phenomenon occurs when several factors such as amount of lubricating oil supplied to the sliding surface, and the surface pressure exerted on the sliding surface are balanced. The balance is obtained in a low sliding resistance since the initial wear is completed in a short time at the initial stage of the operation. Moreover, the lubricating oil is smoothly supplied to the sliding surface and is accumulated in the dimples remaining on the sliding surface, and the sliding resistance after the initial wear can be greatly reduced. Therefore, the clearance between the skirt portion of the piston and the sleeve can be narrow, so that the position of the piston can be stable and tapping of the piston can be prevented, thereby suppressing noise and vibration.

The running-in phenomenon as mentioned in the above should be performed rapidly and with a small amount of wear. The front portion of the protrusion provided along the circumference of the skirt portion which is a sliding surface with a sleeve wears during sliding until the surface pressure becomes stable. The reason of this is that the excessive top portion of the protrusion is removed to maintain a corresponding area of protrusions which can withstand the surface pressure in sliding. The removed top portion remains in the lubricating oil as polishing particles. In order to reduce the amount of the polishing particles as small as possible, it is effective to form beforehand a plane surface which can withstand the surface pressure, rather than forming a sharp edge. Therefore, the protrusion preferably has an approximately trapezoidal portion when viewed in cross section along the sliding direction. In such a design, the surface pressure exerted on the sliding surface and the surface roughness thereof, and the amount of the lubricating oil supplied according to the relative sliding speed, can be stable in a shorter period, as opposed to the case in which a sharp edge is formed by machining.

In order to yield the above-mentioned advantages, the dimples must be of appropriate size. When the dimples are too small, the function of accumulating the lubricating oil is not sufficient, and the function of extracting the lubricating oil toward the sliding surface is not sufficient since the drain portion is too small. In contrast, when the dimples are too large, the protrusion is acutely deformed, and the functions by the protrusion cannot be obtained. The dimple can be formed by shot peening processing. In this case, the average depth of the dimples is preferably in the range of 0.6 to 1.8 μm according to the limitations of the size of the dimples.

FIGS. 6A and 6B show cross sections of the protrusions before initial wear. FIG. 6A shows an embodiment having a recess with a circular cross section, however, the invention is not limited to this embodiment. The invention can be applied to an embodiment in which the protrusion has a circular cross section as shown in FIG. 6B opposing that of FIG. 6A, or recesses and protrusions extend as waves in cross section as shown in FIG. 6C. Alternatively, the invention can be applied to an embodiment in which the recess and the protrusion have a trapezoidal cross section as shown in FIG. 6C, or have a triangular cross section as shown in FIG. 6E. In order to yield the advantages of the invention, the distance P of the protrusions is preferably in the range of 200 to 400 μm, and more preferably is in the range of 250 to 300 μm. The height $H_1$ to the top edge of the protrusion from the bottom of the recess before the initial wear is preferably 7 to 15 μm, and more preferably is 8 to 12 μm.

In the shot peening processing for forming dimples, fine particulate glass beads are preferably projected to the piston by air. The average diameter of the shot is preferably in the range of 20 to 60 μm, and the diameter of the shot is preferably 20 μm or more. The air pressure in the projection of the shot is preferably in the range of 1.5 to 5.0 kg/cm². It should be noted that although the dimples can be formed on only the protrusion, it is preferable to form the dimples on the overall surface including the recess. The protrusions and the dimples are preferably formed on not only the skirt portion of the piston, but also grooves for piston rings and a land, so that production of unusual noises between the groove and piston ring and between the land and the sleeve are prevented.

It should be noted that the sliding members of the invention are not limited to the above-mentioned pistons, but are applicable to any types of members. For example, the invention can be applied to reciprocal sliding members and rotating sliding members such as piston-pins, sliding metals for internal combustion engines, and camshaft holders. By designing at least one of a pair of sliding members in the above manner, the same advantages as described above, in,which lubricating oil can be maintained on the sliding surface and production of an unusual noise can be prevented, can be obtained.

Furthermore, solid lubricants such as molybdenum disulfide and fluorine-type resins can be provided in advance or after shot peening processing by surface treatment processing such as coating, impregnation, and diffusion.

BRIEF DESCRIPTION OF THE DRAWINGS

FIGS. 1A and 1B are perspective views showing enlarged surfaces of a piston with no dimple, wherein FIG. 1A shows the status before initial wear, and FIG. 1B shows the status after initial wear.

FIGS. 2A and 2B are cross sections of a piston with no dimples, wherein FIG. 2A shows the status before initial wear, and FIG. 2B shows the status after initial wear.

FIGS. 3A and 3B are perspective views showing enlarged surfaces of a piston of the invention, wherein FIG. 3A shows the status before initial wear, and FIG. 3B shows the status after initial wear.

FIGS. 4A and 4B are cross sections of a piston of the invention, wherein FIG. 4A shows the status before initial wear, and FIG. 4B shows the status after initial wear.

FIGS. 6A and 6B are cross sections of protrusions of pistons before initial wear, wherein FIG. 6A shows a piston having a circular recess, and FIG. 6B shows a piston having a circular protrusion adversely to FIG. 6A.

FIGS. 6C through 6E are cross sections of protrusions of pistons before initial wear, wherein FIG. 6C shows a piston in which recesses and protrusions extend as waves, FIG. 6D shows a piston in which the cross sections of the recess and the protrusion are trapezoidal, and FIG. 6E shows a piston in which the cross sections of the recesses and the protrusions are triangular.

THE BEST MODE FOR CARRYING OUT THE INVENTION

A. Production of Samples

Figure 1A:
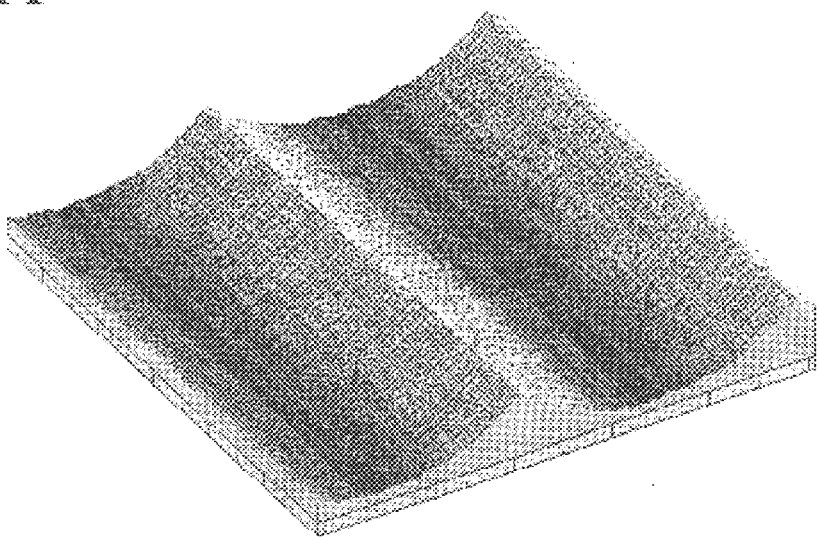
Figure 1B:
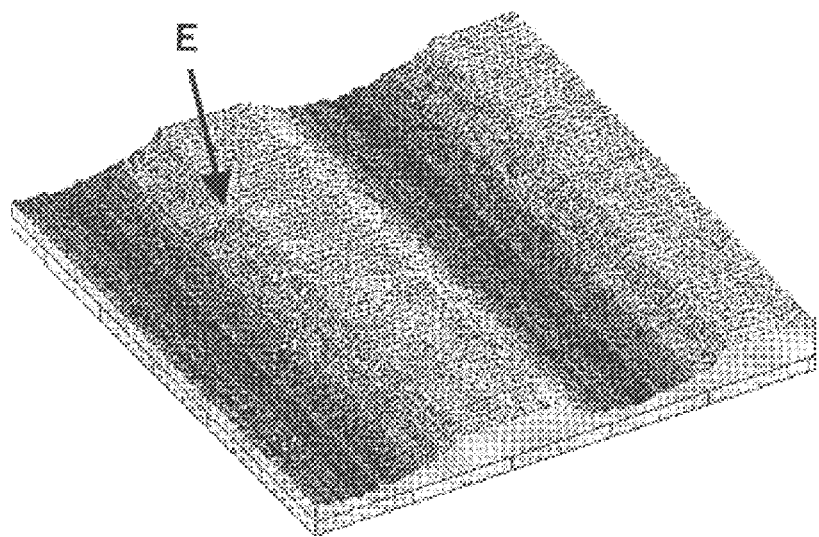
Figure 2A:
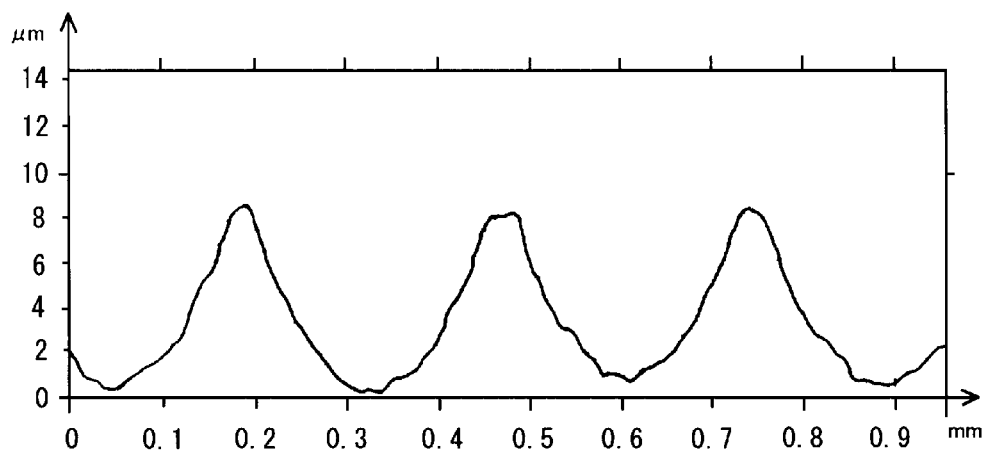
Figure 2B:
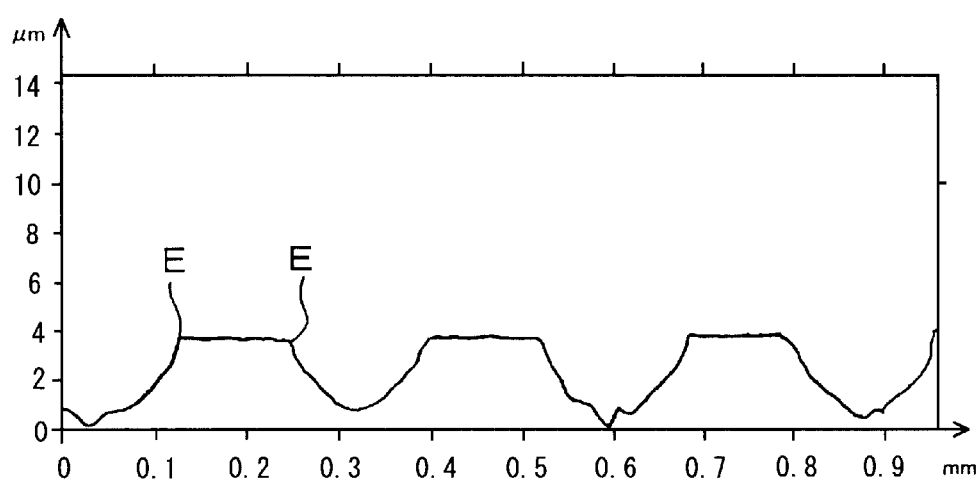
Figure 3A:
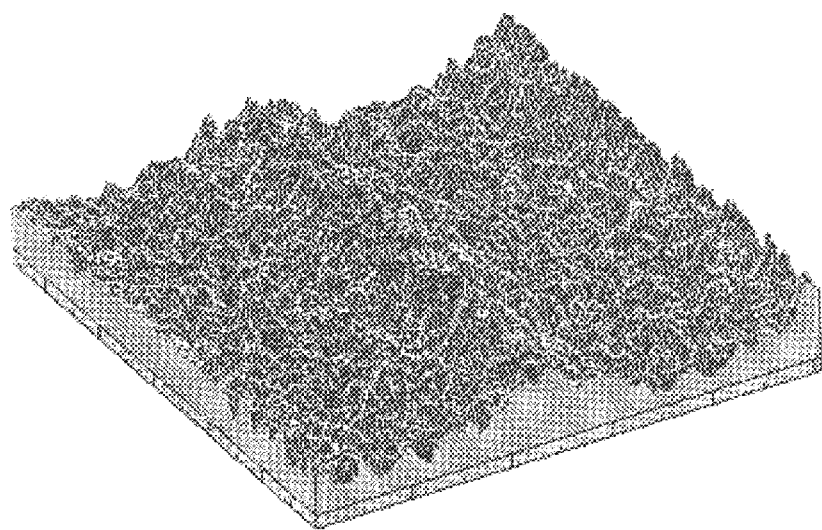
Figure 3B:
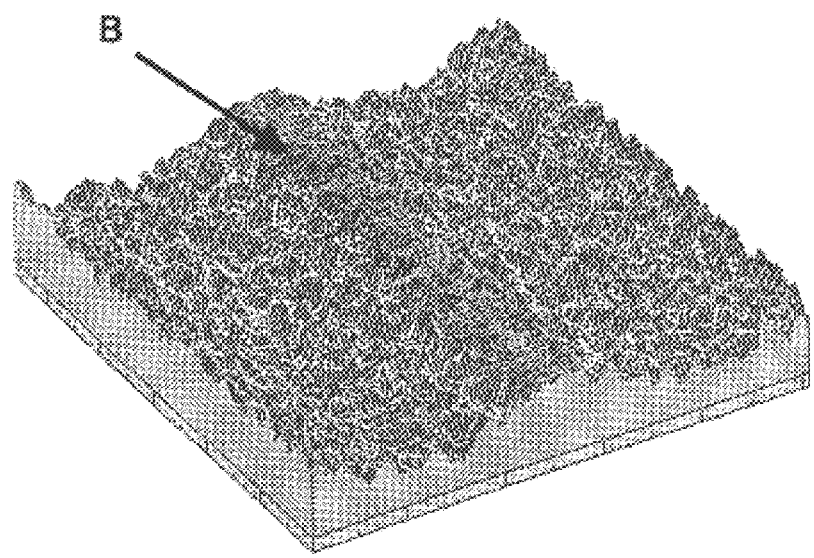
Figure 4A:
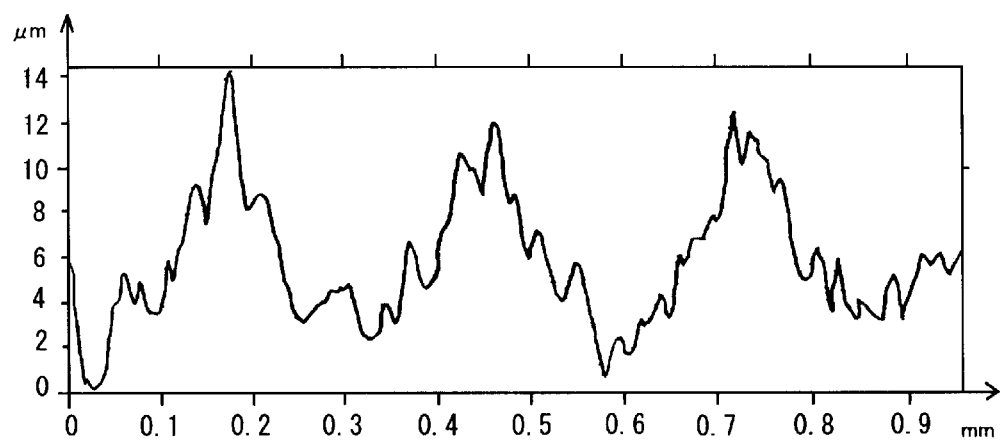
Figure 4B:
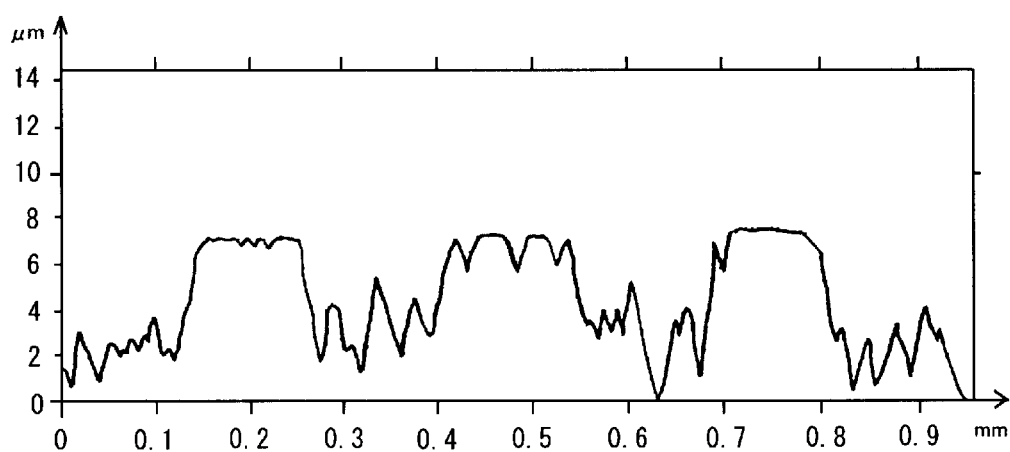
Figure 5A:
FIG. 5A is a schematic drawing showing a cross section of a conventional piston.
Figure 5B:
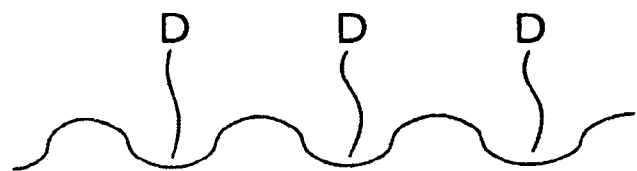
FIG. 5B is a schematic drawing showing a cross section of a piston of the invention.
Figure 5C:
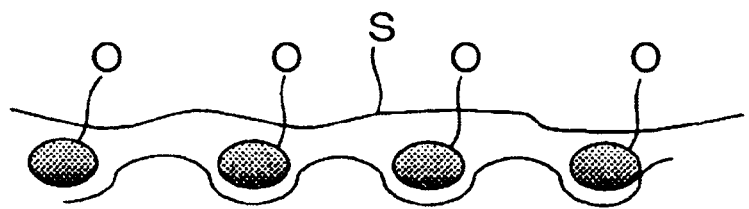
FIG. 5C shows the status in which an oil droplet is accumulated in a dimple.
Figure 6A:
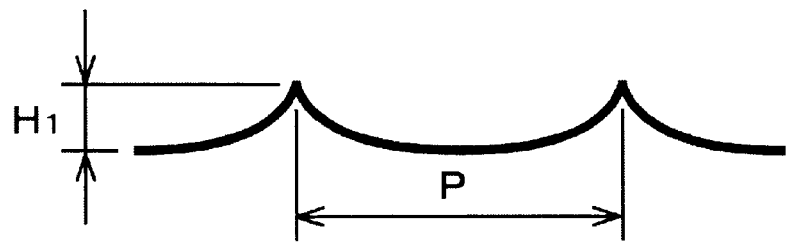
Figure 6B:
Figure 6C:
Figure 6D:
Figure 6E:

Pistons having a typical shape and a size were produced. Protrusions (streaks) having a cross section shown in FIG. 6A were formed around the outer circumference of the pistons. The distance between the protrusions was about 250 $\mu$m, and the height thereof was about 10 $\mu$m. The piston was attached to a turntable, and glass beads having an average diameter of 40 $\mu$m were projected to the side surface of the piston by compressed air while rotating the piston. Plural samples were produced while the incident pressure was changed to 5.0 kg/cm$^2$ from 1.5 kg/cm$^2$.

B. Measurement of Dimple

Figure 7:
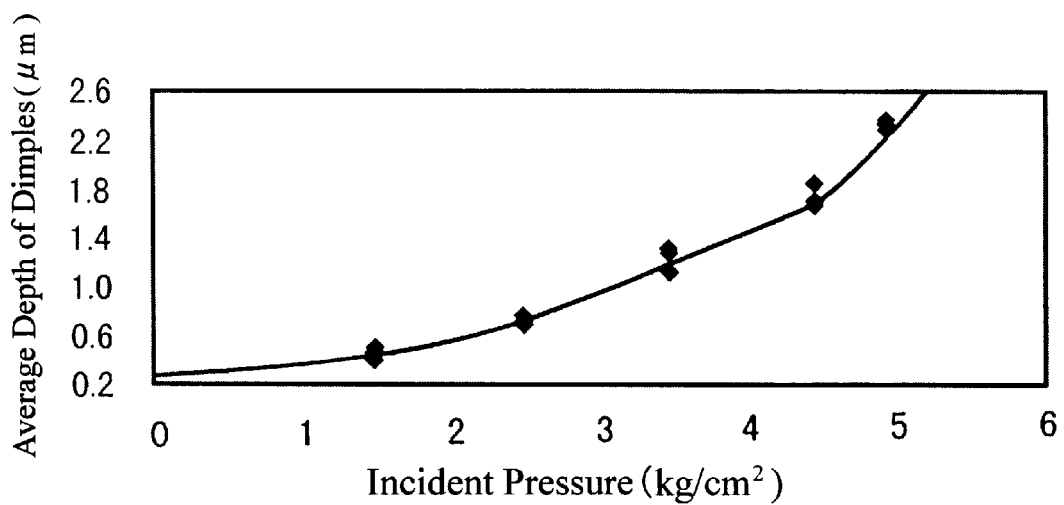
FIG. 7 is a diagram showing the relationship between the incident pressure and the average depth of dimples in an embodiment.

For evaluation of the average depth of dimples in each sample, surface roughness Ra of the sample was measured, and the Ra was defined as the average depth. The results are shown in FIG. 7. As will be understood from FIG. 7, the depth of the dimple increases as the incident pressure in shot peening processing is increased.

C. Measurement of Friction Loss

Figure 8:
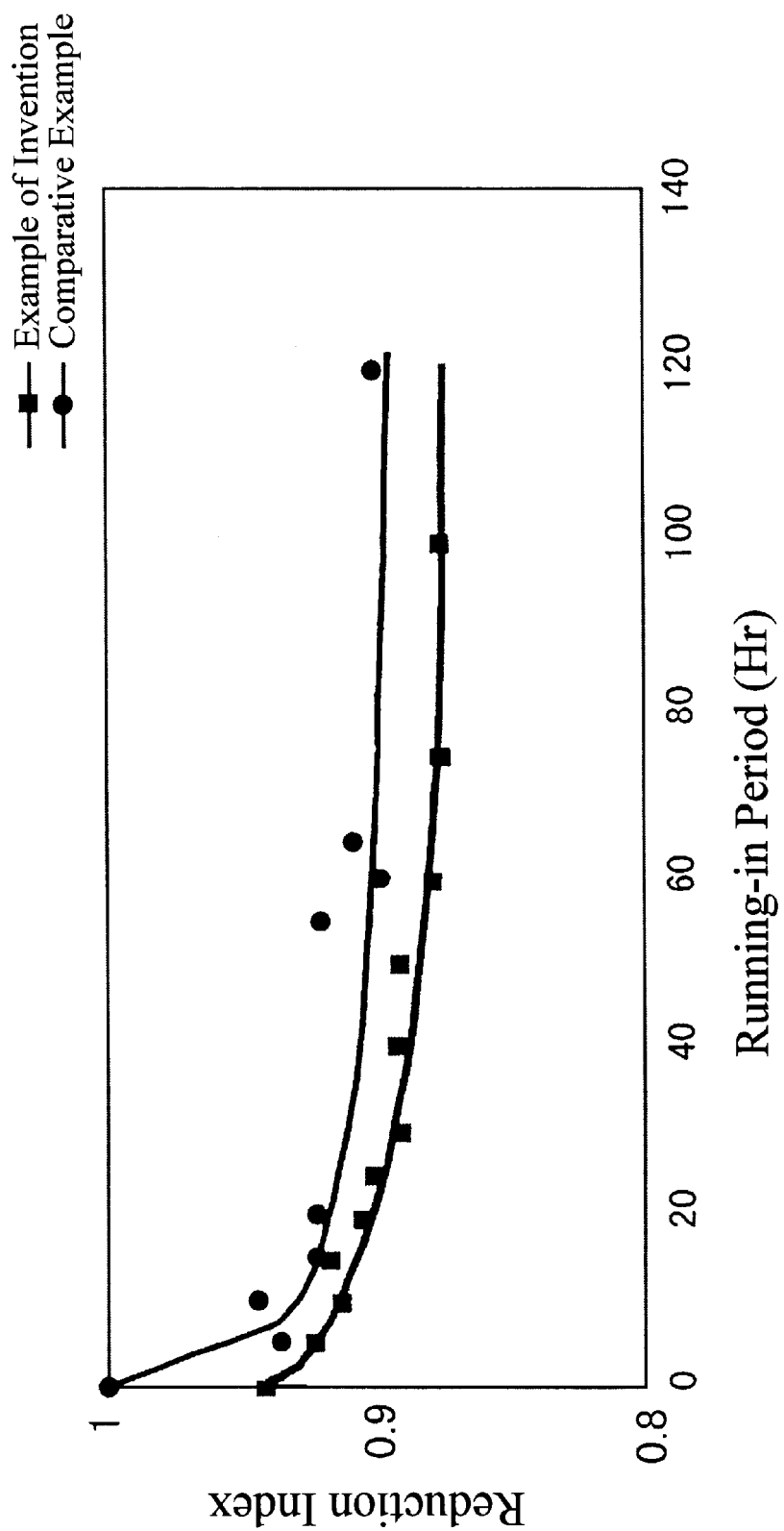
FIG. 8 is a diagram showing the relationship between the running-in period and the reduction index in an embodiment.

Suitable samples were selected, and were installed in internal combustion engines, and the friction loss thereof was then measured. In the measurement of friction loss, the friction loss of horsepower of the combustion engine was measured, and the reduction index of the sliding resistance was calculated according to the change of the horsepower. The reduction index in the starting operation is defined as "1", and the change with the passage of time in the reduction index is shown in FIG. 8. It should be noted that 0.9% of the reduction index represents that the sliding resistance is reduced at the rate of 10%. As a comparative example, a piston having the cross section shown in FIG. 6A with no shot peening processing was subjected to a similar running-in operation, and the result thereof is shown in FIG. 8.

As is shown in FIG. 8, the reduction index in the invention rapidly decreased to 0.94 from 1 when the running-in operation was started, and then slowly declined further. In contrast, the reduction index in the comparative example decreased more slowly than in the invention and was then maintained at a higher level than in the invention. Comparing the reduction index after completion of the running-in operation, it was known that the example of the invention was 2.2% lower than in the comparative example.

D. Sliding Test

Figure 9:
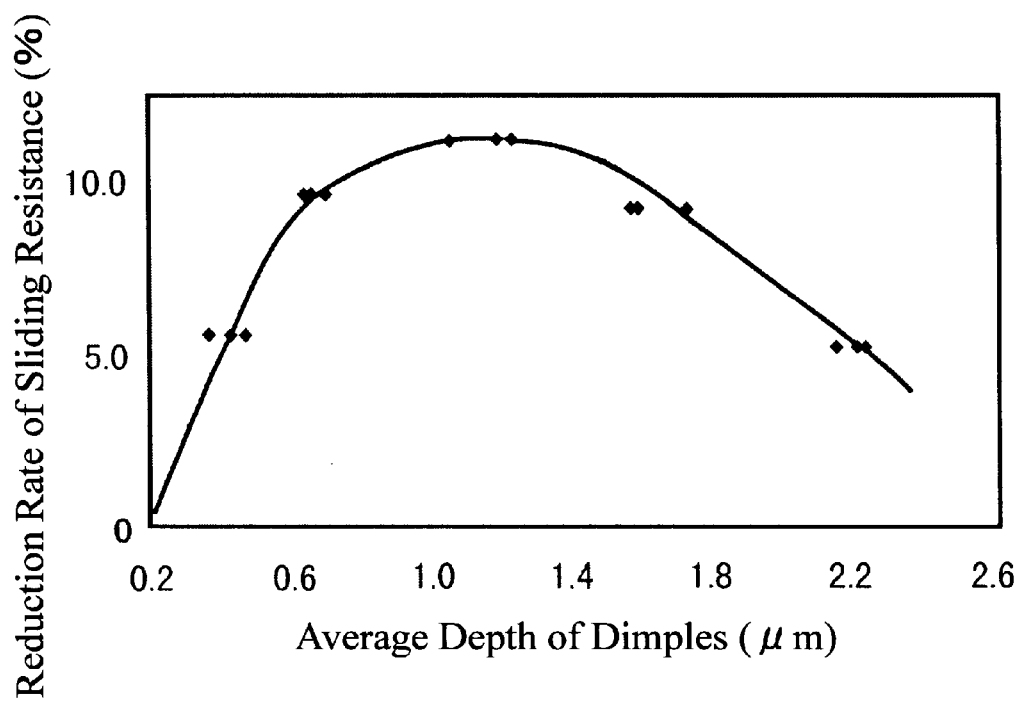
FIG. 9 is a diagram showing the relationship between the average depth of dimples and the reduction rate of sliding resistance in an embodiment.

The side surface of the sample in the example was thrust against a plate which simulated a sleeve, and was reciprocally moved at a stroke of 50 mm. In this case, lubricating oil was dropped on the surface of the plate, and the thrusting load was gradually increased. In this condition, the real-time frictional resistance was measured, and the average frictional resistance per unit time was measured by integrating the frictional resistance over time. The sample in the comparative example used in the above running-in operation was subjected to the same sliding test as the above. The average frictional resistance in the example when the average frictional resistance in the comparative example was defined to be "1" was calculated, and the reduction rate (%) of sliding resistance in the invention with respect to that of the comparative example was calculated. The relationship between the average depth of dimples and the reduction rate of sliding resistance is shown in FIG. 9. As is understood from FIG. 9, the reduction rate of sliding resistance is large when the average depth of dimples is in the range of 0.6 to 1.8 $\mu$m.

Figure 10:
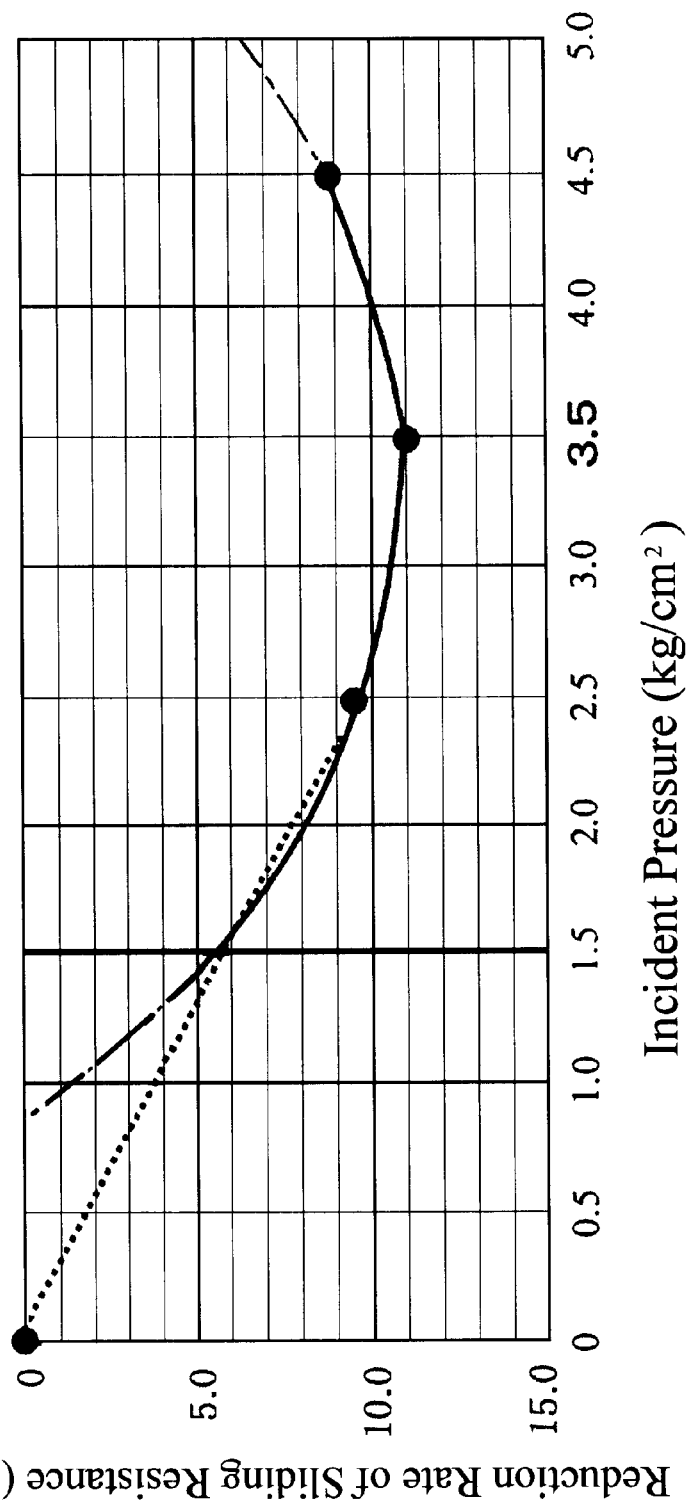
FIG. 10 is a diagram showing the relationship between the incident pressure and the reduction rate of sliding resistance in an embodiment.

The relationship shown in FIG. 9 is arranged into the relationship between the incident pressure in the shot peening processing and the reduction rate of sliding resistance, and this is shown in FIG. 10. In FIG. 10, the incident pressures in the range of 2.5 to 4.5 kg/cm$^2$ are plotted. A curved line is applied to the plot and the curved line is extrapolated as indicated by the dashed line. As a result, it is assumed that the reduction rate of sliding resistance is large when the incident pressure is in the range of 1.5 to 5.0 kg/cm$^2$.

E. Seizing Test

Figure 11:
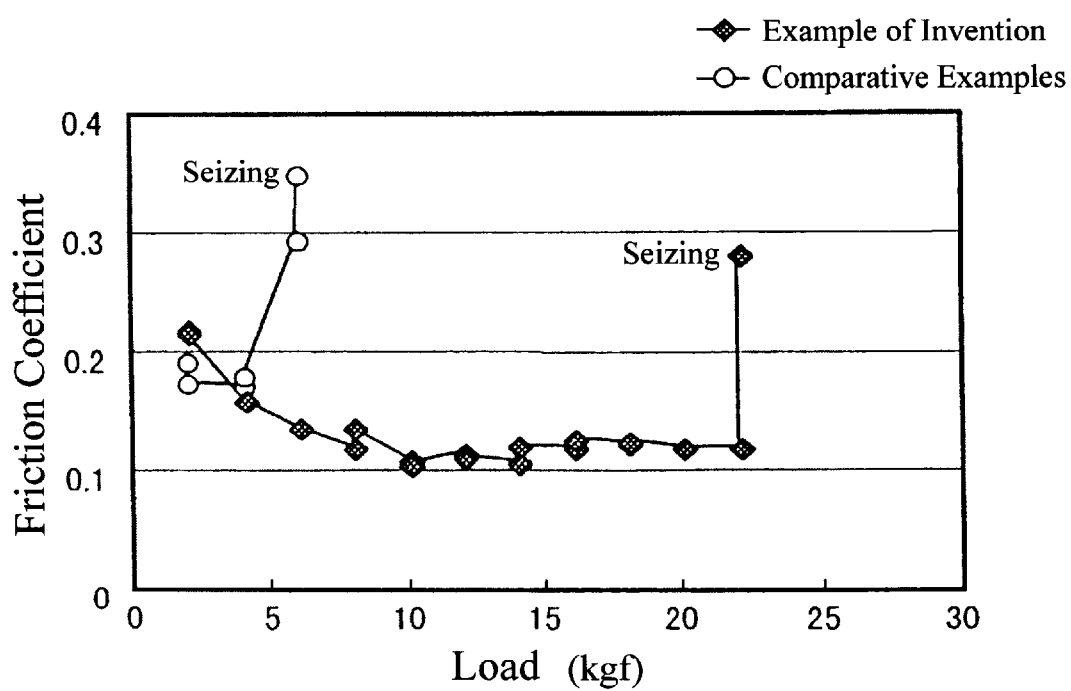
FIG. 11 is a diagram showing the relationship between the load exerted on samples and the friction coefficient in an embodiment.

In the above sliding test, dropping of the lubricating oil was stopped and the piston was reciprocally moved until seizing occurred while measuring the friction coefficient. The samples in the invention and the comparative example were subjected to the test, and the results thereof are shown in FIG. 11. As is shown in FIG. 11, seizing occurred at 7 kgf in the comparative example. In contrast, seizing did not occur until 22 kgf in the invention. Thus, it was confirmed that the piston in the invention is superior in seizing resistance, and this demonstrated that it is effective to avoid production of an unusual noise.

As is explained above, since the invention includes a protrusion extending along the outer circumference and fine dimples provided on the surface of the protrusion, an lubricating oil is accumulated in the dimples, and is easily extracted through a drain portion formed by the dimple in a running-in operation. As a result, production of an unusual noise is prevented and the sliding resistance after a running-in operation can be reduced in the invention. Therefore, since the clearance between the skirt portion of the piston and the sleeve can be narrow, so that the position of the piston can be stable, and tapping of the piston can be prevented, thereby suppressing noise and vibration.

What is claimed is:

1. Sliding members having a sliding surface and which slide with respect to each other in a sliding direction, the sliding surface of at least one of the sliding members comprising:

a protrusion extending along a direction intersecting the sliding direction; and fine dimples provided on a surface of the protrusion.

2. Sliding members according to claim 1, wherein the dimples have an average depth in the range of 0.6 to 1.8 μm.

3. Sliding members according to claim 1, wherein the protrusion has an approximately trapezoidal portion when viewed in cross section along the sliding direction.

4. Sliding members according to claim 1, wherein the dimples form drain portions at a peripheral portion of the approximately trapezoidal portion.

5. Sliding members according to claim 1, wherein the dimple functions as an oil reservoir and accumulates lubricating oil.

6. Sliding members according to claim 1, wherein the dimple is formed by shot peening processing using glass beads having an average diameter in the range of 20 to 60 μm.

7. Sliding members according to claim 6, wherein the glass beads have diameters of 20 μm or more.

8. Sliding members according to claim 1, wherein the sliding surface has plurality of protrusions, and the distance therebetween is in the range of 200 to 400 μm.

9. Sliding members according to claim 1, wherein the distance between the protrusions is in the range of 250 to 300 μm.

10. Sliding members according to claim 1, wherein the sliding member is subjected to initial wear, and the protrusion has a height before initial wear in the range of 7 to 15 μm.

11. Sliding members according to claim 1, wherein the sliding member is subjected to initial wear, and the protrusion has a height before initial wear in the range of 8 to 12 μm.

12. Sliding members according to claim 8, wherein the dimple is provided at a recess provided between the protrusions.

13. A piston for internal combustion engines, the piston comprising:

a skirt portion provided on a side surface of a piston body;

a protrusion provided on at least the skirt portion and extending along the outer circumference thereof; and fine dimples provided on a surface of the protrusion.

14. A piston for internal combustion engines according to claim 13, wherein the dimple is provided in a groove for a piston ring.

15. A piston for internal combustion engines according to claim 13, wherein the dimple is provided on a land.

16. A piston for internal combustion engines according to claim 13, wherein the dimples have an average depth in the range of 0.6 to 1.8 μm.

17. A piston for internal combustion engines according to claim 13, wherein the protrusion has an approximately trapezoidal portion when viewed in cross section along the sliding direction.

18. A piston for internal combustion engines according to claim 17, wherein the dimples form drain portions at a peripheral portion of the approximately trapezoidal portion.

19. A piston for internal combustion engines according to claim 13, wherein the dimple functions as an oil reservoir and accumulates lubricating oil.

20. A piston for internal combustion engines according to claim 13, wherein the dimple is formed by shot peening processing using glass beads having an average diameter in the range of 20 to 60 μm.

21. A piston for internal combustion engines according to claim 20, wherein the glass beads have diameters of 20 μm or more.

22. A piston for internal combustion engines according to claim 13, wherein the sliding surface has plurality of protrusions, and the distance therebetween is in the range of 200 to 400 μm.

23. A piston for internal combustion engines according to claim 22, wherein the distance between the protrusions is in the range of 250 to 300 μm.

24. A piston for internal combustion engines according to claim 13, wherein the sliding member is subjected to initial wear, and the protrusion has a height before initial wear in the range of 7 to 15 μm.

25. A piston for internal combustion engines according to claim 13, wherein the sliding member is subjected to initial wear, and the protrusion has a height before initial wear in the range of 8 to 12 μm.

26. A piston for internal combustion engines according to claim 22, wherein the dimple is provided at a recess provided between the protrusions.

* * * * *